Feb. 12, 1924. 1,483,240
C. J. OLSON
PRESSURE REGULATING VALVE
Filed July 19, 1920 2 Sheets-Sheet 1
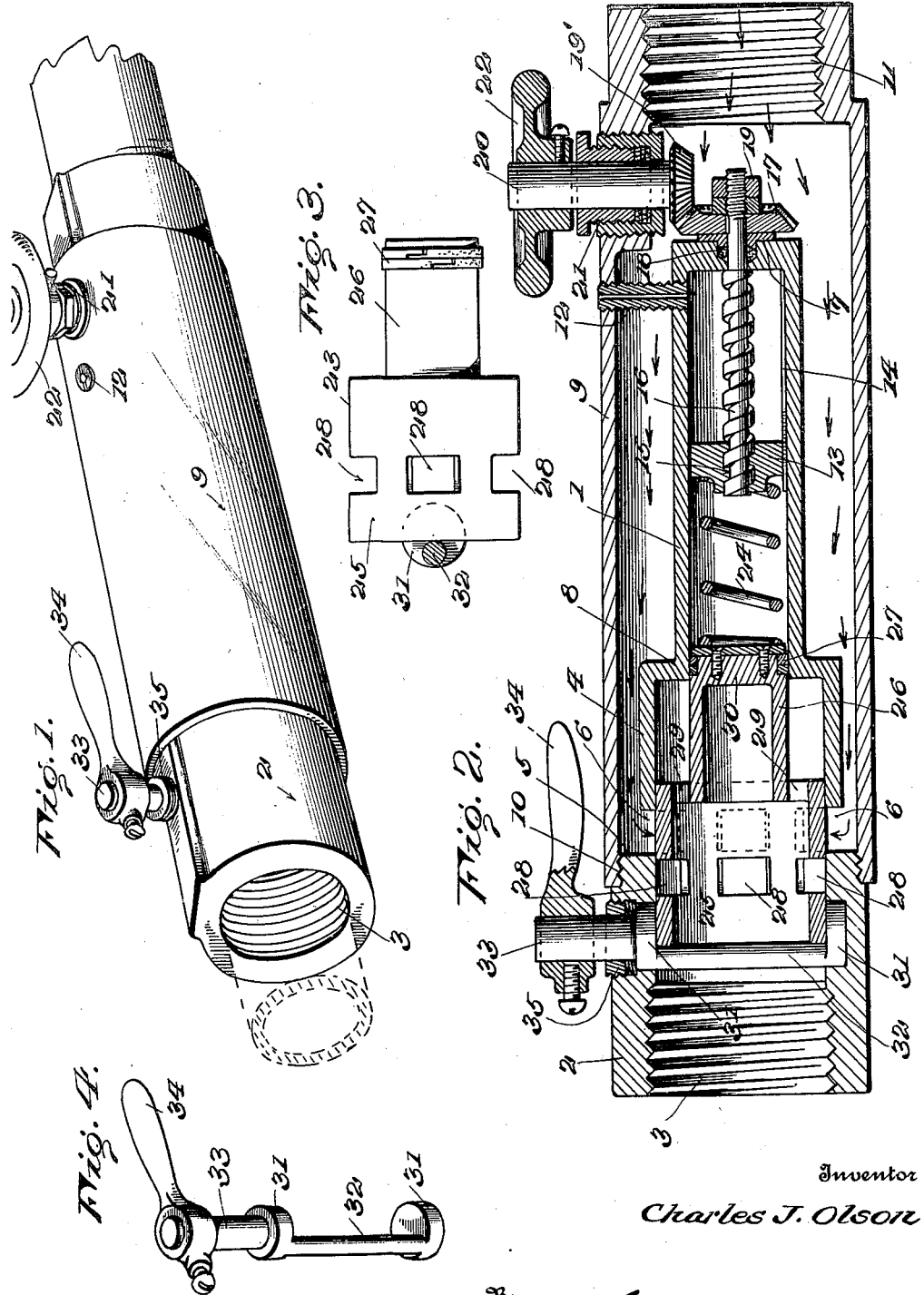
Inventor
Charles J. Olson.
By
Attorneys

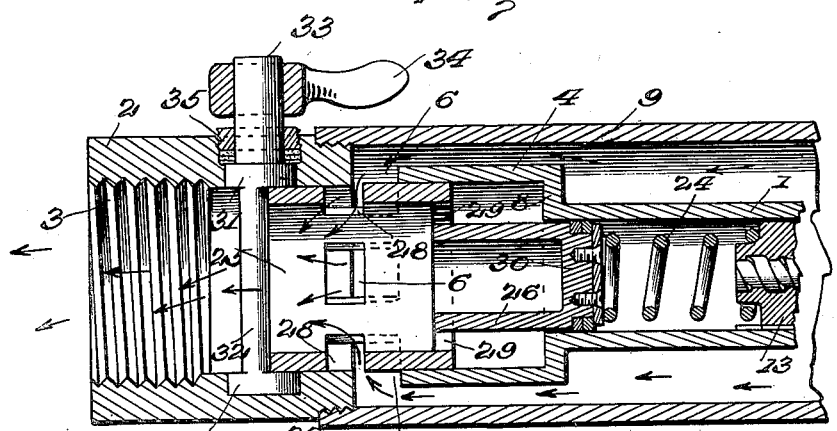
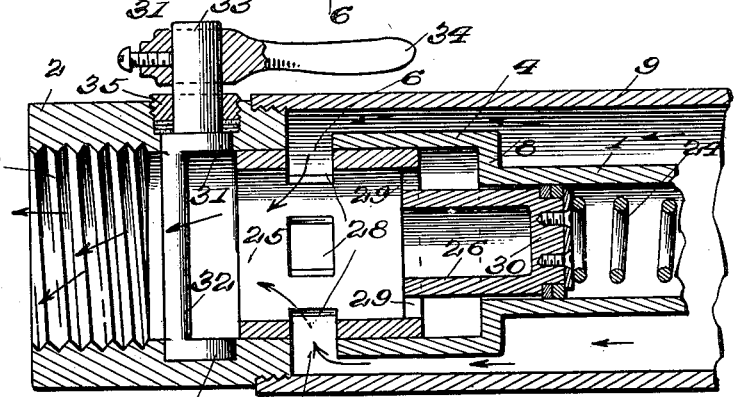
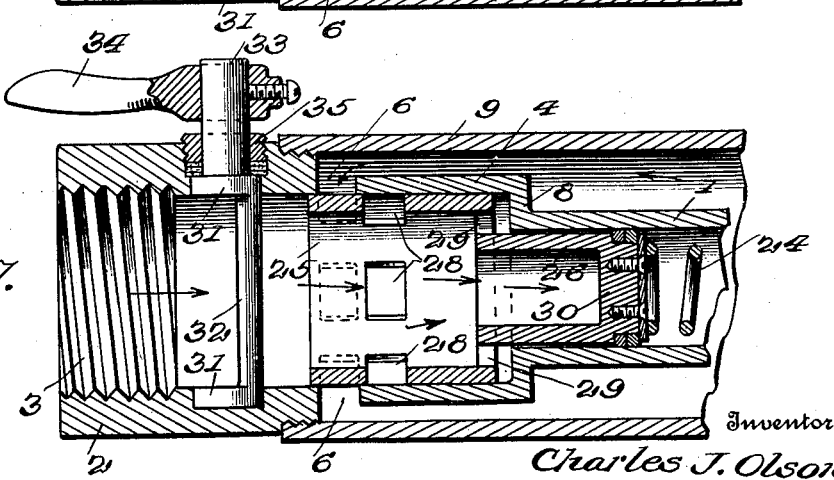

Patented Feb. 12, 1924.

1,483,240

UNITED STATES PATENT OFFICE.

CHARLES J. OLSON, OF MUSKEGON, MICHIGAN, ASSIGNOR TO THE OLSON PNEUMATIC SAW AND VALVE COMPANY, OF INDIANAPOLIS, INDIANA.

PRESSURE-REGULATING VALVE.

Application filed July 19, 1920. Serial No. 397,204.

*To all whom it may concern:*

Be it known that I, CHARLES J. OLSON, a citizen of the United States, residing at Muskegon, in the county of Muskegon and State of Michigan, have invented certain new and useful Improvements in Pressure-Regulating Valves, of which the following is a specification.

This invention relates to fluid-pressure regulating valves and has for its object the provision of an easily adjusted valve whereby the flow of fluid whether it be steam, air, oil, or other agent may be entirely cut-off or automatically controlled so that the supply will be adjusted to the load upon the motor. The objects of the invention are attained in such a device as is illustrated in the accompanying drawings and the invention resides in certain novel features which will be particularly pointed out in the claims following a detailed description.

In the drawings—

Figure 1 is a perspective view of a valve embodying my invention;

Fig. 2 is a longitudinal section showing the flow of fluid cut-off;

Fig. 3 is a plan view of the cut-off member or piston;

Fig. 4 is a detail perspective view of the adjusting eccentric, and

Figs. 5, 6 and 7 are longitudinal sections of the device showing different adjustments of the same.

In carrying out my invention, I employ a cylinder 1 connected integrally with a coupling member 2 which is internally threaded, as shown at 3, whereby it may be secured to a conductor through which the fluid will flow to the engine or motor. The coupling member 2 is exteriorly reduced, as shown at 4, whereby an annular shoulder 5 is provided and immediately adjacent said shoulder the reduced portion 4 is constructed with ports 6 through which the pressure fluid will flow to the motor. The end of the cylinder remote from the coupling member 2 is closed, as shown at 7, and between the said closed end and the exteriorly reduced portion 4 is an annular shoulder 8. A housing or casing 9 is arranged concentrically about the cylinder 1 and this housing or casing has a threaded connection, as shown at 10, with the coupling member 2. The housing is of larger internal diameter than the exterior diameter of the portion 4 and the main portion of the cylinder 1 and consequently an annular space is provided between the cylinder and the housing through which the fluid may flow to the ports 6 as will be readily understood. It will also be noted upon reference to Fig. 2 that the end of the housing remote from the enlargement 2 is interiorly threaded, as shown at 11, whereby it may be secured to a supply pipe. A vent tube 12 is removably secured in the walls of the housing 9 and the cylinder 1 adjacent the inner closed end 7 of the cylinder to permit escape of air which might retard adjustment of the abutment within the cylinder and also to permit lubricant to be supplied to the cylinder. The adjustable abutment is shown at 13 and may be of any convenient form, but is illustrated as a nut or disk fitting within the cylinder and held against rotation by a rib or feather 14 on the wall of the cylinder passing through a longitudinal groove or notch in the edge of the nut. The nut is provided with a central threaded bore, as shown at 15, and this bore is engaged by one end of a worm 16 which is journaled at its opposite end in the end wall 7 of the cylinder, as clearly shown in Fig. 2. A beveled gear 17 is secured upon the end of the worm 16 and packing 18 is fitted in the end wall 7 of the cylinder around the journal portion of the worm in the usual manner and as will be readily understood. Lock nuts 19 may be fitted upon the end of the worm to prevent the gear 17 dropping therefrom or any other convenient retaining means may be employed. The gear 17 meshes with the beveled gear 19' which is secured upon the lower end of a shaft 20 journaled in and extending through a packing box 21 in the wall of the housing and equipped at its outer end with a wheel 22 or other convenient form of turning handle. Slidably mounted within the cylinder is a piston 23 and between the inner end of said piston and the abutment 13 is a spring 24 which bears upon the piston in opposition to the back pressure of the motive fluid thereon, the tension of the spring being regulated by adjusting the worm 16 and the abutment 13 in an obvious manner.

The piston 23 comprises an outer larger portion 25 which is of proper diameter to fit snugly but slidably within the coupling member 2 and the intermediate portion 4 of the cylinder, and from the inner end of this larger portion 25 a reduced sleeve-like extension 26 projects inwardly, the said extension being of proper diameter to fit slidably within the main portion of the cylinder 1, as clearly shown. Suitable piston rings 27 are fitted around the extension 26 so as to prevent leakage of fluid within the cylinder 1 and around the said extension. Ports 28 are formed in the wall of the larger portion 25 of the piston and these ports are properly arranged to register with the ports 6 of the cylinder while vent openings 29 are formed in the transverse intermediate wall of the piston whereby the fluid pressing against the said wall may enter the space between the same and the wall defining the shoulder 8 of the cylinder and thereby balance the pressure upon the piston around the extension 26. The inner end of the said extension is closed by a wall 30, as clearly shown, and this construction permits the use of a relatively small coiled spring 24 to obtain the desired operation, the effective back pressure upon the piston being that exerted upon the restricted area of the closed end of the piston and consequently the spring is called upon to meet a smaller force than if the effective back pressure was upon the entire end surface of the piston. The outer end of the piston is open to permit the flow of fluid to the motor and is adapted to bear against and be operated upon by the adjusting eccentric. This eccentric comprises two circular disks 31 which are rotatably seated in recesses in the inner wall of the coupling end 2 of the cylinder and are connected by an eccentric bar or rod 32. A stem 33 rises from the upper disk through the wall of the member 2 and has a handle 34 of any convenient form secured to its upper extremity, a suitable packing box 35 being fitted around the said stem within the wall of the cylinder, as clearly shown.

In assembling the parts, the shaft 20 with the gear 19′ is fitted in the wall of the casing after which the packing box is secured in position around said shaft and the handle 22 applied. The worm 16 and the nut 13 are fitted in the end portion of the cylinder 1 after which the gear 17 is secured upon the worm. The spring 24 is then placed in the cylinder and the piston 23 placed in the end of the cylinder so that it will bear properly upon the spring. The piston may be held in the cylinder by the insertion of any convenient tool through its open end to bear upon the inner end wall of the piston so as to hold it against the tension of the spring 24, while the adjusting eccentric is inserted transversely through the wall of the cylinder to bring the lower disk 31 into its seat. It will be understood, of course, that the chamber for the packing box 35 is of such diameter that the disks 31 may readily pass therethrough, the packing box being fitted in place after the disks are seated and the handle 34 being then secured upon the stem 33. The cylinder and the parts assembled therewith may be then inserted through the open end of the housing or casing 9 and pushed into the same until the gear 17 meets the gear 19 whereupon they will readily mesh, after which the vent tube 12 may be inserted. The device will then be ready for operation after it has been fitted in the line conducting the pressure fluid from the generator to the motor.

Normally, the handle 34 will be turned to the position shown in Figs. 1 and 2 and will occupy said position when the device is connected into a supply line. In this position, the piston or cut-off valve will be held by the spring 24 with an imperforate portion of its wall extending across the ports 6 of the cylinder and the flow of fluid will thus be cut off. When the fluid is turned into the supply line, the handle 34 is manipulated so as to turn the eccentric to the position shown in Fig. 5 thereby pushing the piston inwardly against the tension of the spring 24 so as to permit the ports 28 to register somewhat with the ports 6 and permit a restricted flow of fluid to the motor. The handles 34 and 22 should now be adjusted so that the volume of fluid passing to the motor will be just sufficient to drive the motor at the desired speed without any load thereon and the tension of the spring 24 should be enough to just overbalance the friction of the motor. The valve or piston will then remain in its adjusted position inasmuch as it will be nicely balanced between the spring and the fluid pressure. When the motor is working, as the load increases the back pressure upon the piston will also increase and will overcome the tension of the counter-balance spring 24 and force the piston to the position shown in Fig. 6 whereupon a larger volume of motive fluid may pass to the motor as will be readily understood. After the motor is running, the handle 34 is returned to its initial position, as shown in Fig. 6, so that if the head of a motor cylinder should blow off or a break occur in the supply line between the motor and the valve, the back pressure would be eliminated and the spring 24 would then at once expand so as to force the piston or cut-off valve outwardly until its end was in contact with the eccentric which is the position shown in Fig. 2. The further flow of fluid will then, of course, be cut-off and the motor will stop instantly. As the supply of the motive fluid is thus automatically cut-off at once upon a substantial reduction of the back pressure loss of life or damage to property is avoided.

If it be desired to operate the motor at a pressure lower than that at the generator or source of supply, the eccentric is turned to the position shown in Fig. 7 which will push the piston into the position shown in Fig. 6 and will permit the fluid to flow to the motor and accumulate in the line between the motor and the valve. This accumulation will, of course, exert a back pressure upon the piston which will overcome the force of the counterbalance spring 24 and move the piston to the position shown in Fig. 7 whereby the ports in the piston will be carried inwardly beyond the ports in the cylinder and the further flow of fluid to the motor will be cut off. When the accumulated pressure in the line between the valve and the motor has been reduced through the consumption of power at the motor, the spring 24 will, of course, move the piston outwardly but its outward movement will be arrested by the eccentric at such point that the ports of the piston will again register completely with the ports in the cylinder and a full flow of fluid again established.

My present device is exceedingly simple in the construction, arrangement and operation of its parts and may be installed in any line supplying fluid pressure of any type to a motor. It will be found especially advantageous for use in places where the available space is limited and will operate automatically and in a highly efficient manner under all conditions.

It will be understood, of course, that in plants supplying fluid-pressure from a single generator to a plurality of motors, a valve may be inserted in each branch line so that if an accident should occur in any one branch line, that line would be automatically cut out without affecting the efficiency of any other branch line or the main line. It will also be understood that the valves may be adjusted so that some motors would run under high pressure and some under low pressure.

Having thus described the invention, what is claimed as new is:

1. A device for the purpose set forth comprising a cylinder, a cut-off mounted axially within the cylinder and actuated directly by back pressure from a motor to open and close under variations in said back pressure, means within the cylinder acting on one end of the cut-off for adjustably setting the cut-off to a normal load, and a counterbalance acting on the opposite end of the cut-off in opposition to the back pressure.

2. A device for the purpose set forth comprising a cylinder having end portions of different diameters and having ports in its side wall and provided with a transverse wall intermediate its ends, the ports being provided in that end portion of the cylinder having the greater diameter, a piston having portions of different diameters working in the respective end portions of the cylinder and provided with ports adapted to register with the ports in the cylinder and further provided with a transverse wall opposing the transverse wall of the cylinder and having longitudinal pressure-equalizing ports therethrough, a counterbalance housed within the smaller portion of the cylinder and bearing upon the smaller portion of the piston, and means for setting the piston in opposition to said counterbalance.

3. A device for the purpose set forth comprising a cylinder having ports in its side, a piston slidably mounted in the cylinder and having ports adapted to register with the ports in the cylinder, an eccentric mounted transversely in the cylinder and adapted to bear upon the outer end of the piston for setting the same, and a counterbalance housed within the cylinder and bearing upon the inner end of the piston.

4. A device for the purpose set forth comprising a cylinder having ports in its side, a piston slidably fitted in the cylinder and having ports adapted to register with the ports in the cylinder, the inner end of the piston being closed and the outer end thereof open, means bearing upon the closed end of the piston to move the same outwardly, and an eccentric comprising disks seated rotatably in the wall of the cylinder, and an eccentric bar connecting said disks and extending across the cylinder in position to bear against the outer end of the piston, and means for setting said eccentric.

5. A device for the purpose set forth comprising a casing, a cylinder secured in the casing in spaced relation therewith, a piston slidably mounted in the cylinder and controlling the flow of pressure fluid therethrough, means in the cylinder acting upon the outer end of the piston to set the same, yieldable counterbalance means within the cylinder acting upon the inner end of the piston in opposition to the said setting means, and means mounted in the casing to vary the effective power of said counterbalance means.

6. A device for the purpose set forth comprising a casing, a cylinder secured within the casing in spaced relation thereto, a vent tube extending through the walls of the casing and the cylinder, a piston slidably fitted in the cylinder and controlling the flow therethrough, setting means for said piston beyond the outer end thereof, a counterbalance spring bearing upon the inner end of the piston, an abutment within the cylinder against which one end of said spring bears, means for holding the abutment against rotation but permitting longitudinal sliding movement thereof, a worm mounted in the end of the cylinder and engaging said abutment, and means mounted in the wall of the casing to operate said worm.

7. A device for the purpose set forth comprising a casing constructed at one end to be connected to a supply line and having a larger bore at its opposite end, a differential cylinder having its smaller end closed and its larger end open, the open larger end of the cylinder being constructed to fit within and be secured in the larger end of the casing and to be secured to a supply line and the cylinder being provided with ports in its side wall adjacent its larger end, a differential piston slidably fitted in the cylinder and having its smaller end closed and its larger end open and provided adjacent its larger end with ports to register with the ports in the cylinder, a counterbalance spring housed in the cylinder and bearing upon the closed end of the piston, and a setting device mounted in and extending across the larger end of the cylinder to bear upon the larger end of the piston.

In testimony whereof I affix my signature.

CHARLES J. OLSON. [L. S.]